(12) United States Patent
Agnoff

(10) Patent No.: US 8,371,435 B2
(45) Date of Patent: Feb. 12, 2013

(54) ROLLER CONVEYOR, DRIVE SYSTEM AND DETECTOR SYSTEM

(76) Inventor: Charles Agnoff, Wilmington, NC (US)

( * ) Notice: Subject to any disclaimer, the term of this patent is extended or adjusted under 35 U.S.C. 154(b) by 175 days.

(21) Appl. No.: 12/928,480

(22) Filed: Dec. 13, 2010

(65) Prior Publication Data

US 2011/0139589 A1 Jun. 16, 2011

Related U.S. Application Data

(60) Provisional application No. 61/284,255, filed on Dec. 16, 2009, provisional application No. 61/337,683, filed on Feb. 11, 2010, provisional application No. 61/338,731, filed on Feb. 23, 2010.

(51) Int. Cl.
 *B65G 13/06* (2006.01)
(52) U.S. Cl. ............ 198/781.03; 198/781.09; 198/781.1
(58) Field of Classification Search ............. 198/781.03, 198/781.05, 781.09, 781.1, 790
See application file for complete search history.

(56) References Cited

U.S. PATENT DOCUMENTS

| | | | | |
|---|---|---|---|---|
| 3,255,865 A * | 6/1966 | Sullivan | | 198/781.03 |
| 3,960,262 A * | 6/1976 | Henig | | 198/781.06 |
| 5,076,420 A * | 12/1991 | Kuschel | | 198/781.08 |
| 5,088,596 A | 2/1992 | Agnoff | | |
| 5,191,967 A * | 3/1993 | Woltjer et al. | | 198/781.06 |
| 6,223,888 B1 * | 5/2001 | Jahns | | 198/781.03 |
| 6,585,107 B1 | 7/2003 | Specht | | |
| 6,672,449 B2 | 1/2004 | Nakamura et al. | | |
| 7,287,640 B1 | 10/2007 | Schmutzler | | |
| 7,748,520 B1 * | 7/2010 | Helgerson et al. | | 198/781.03 |
| 7,866,460 B2 * | 1/2011 | Hentschel et al. | | 198/781.08 |

* cited by examiner

*Primary Examiner* — James R Bidwell
(74) *Attorney, Agent, or Firm* — MacCord Mason PLLC

(57) ABSTRACT

A roller conveyor is described that includes a frame with spaced, parallel side rails; a plurality of parallel driven rollers, each roller having shaft ends extending through the rails; a shaft pulley affixed to the one shaft end outside of a given rail; a rotary drive means including a rotatable drive pulley mounted outside the given rail; and connector means operably connecting the drive pulley to the shaft pulleys, whereby rotation of the drive means rotates the driven rollers. The drive means can be an electric motor mounted beneath the driven rollers or a motorized drive roller in a plane with the other rollers. One of the rollers can be deflectable downwardly by objects conveyed on the conveyor, with the state of a switch being changed when the roller is deflected.

19 Claims, 9 Drawing Sheets

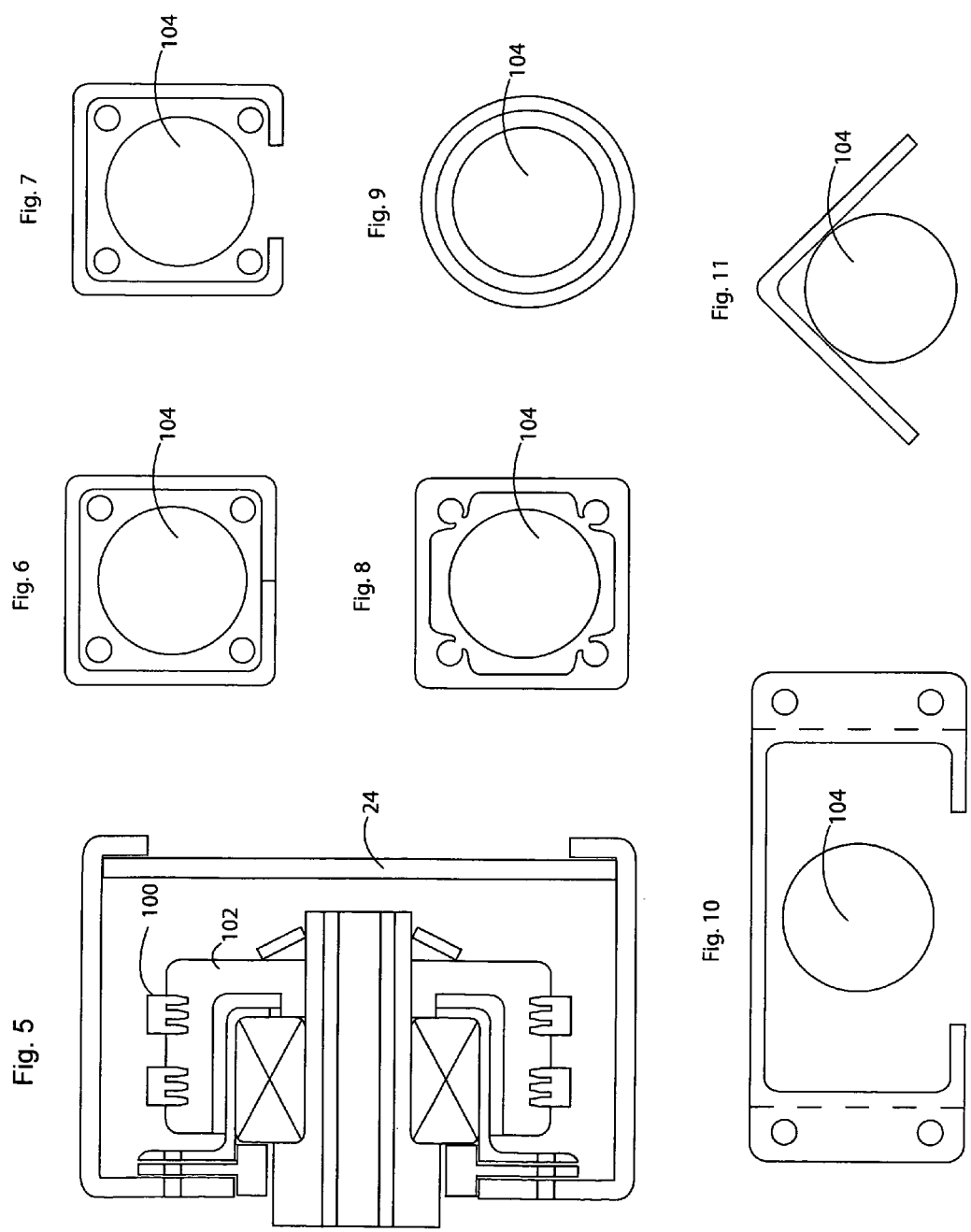

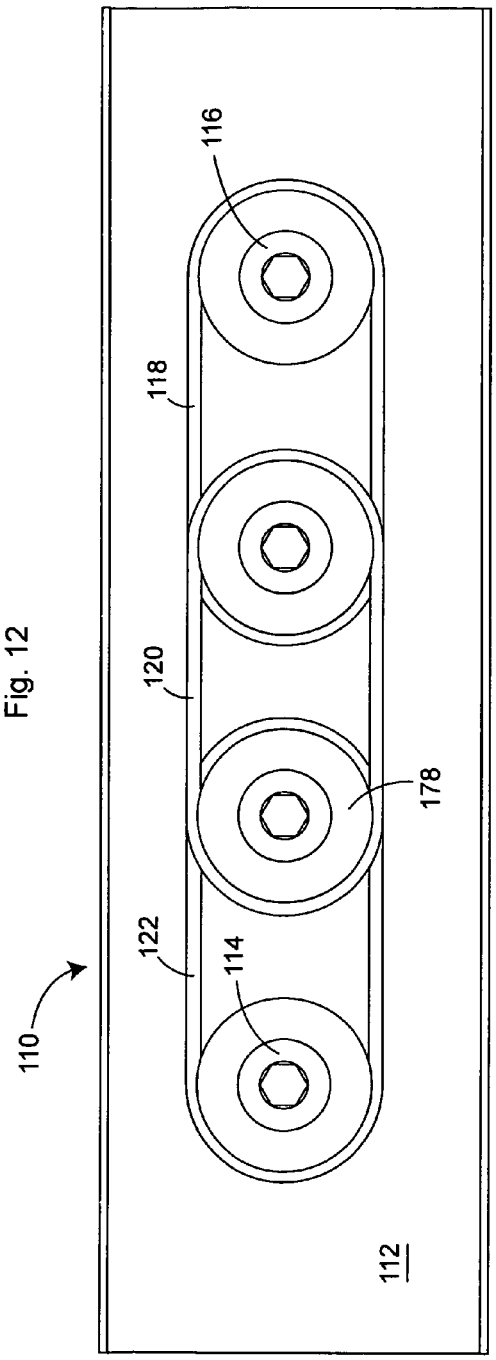
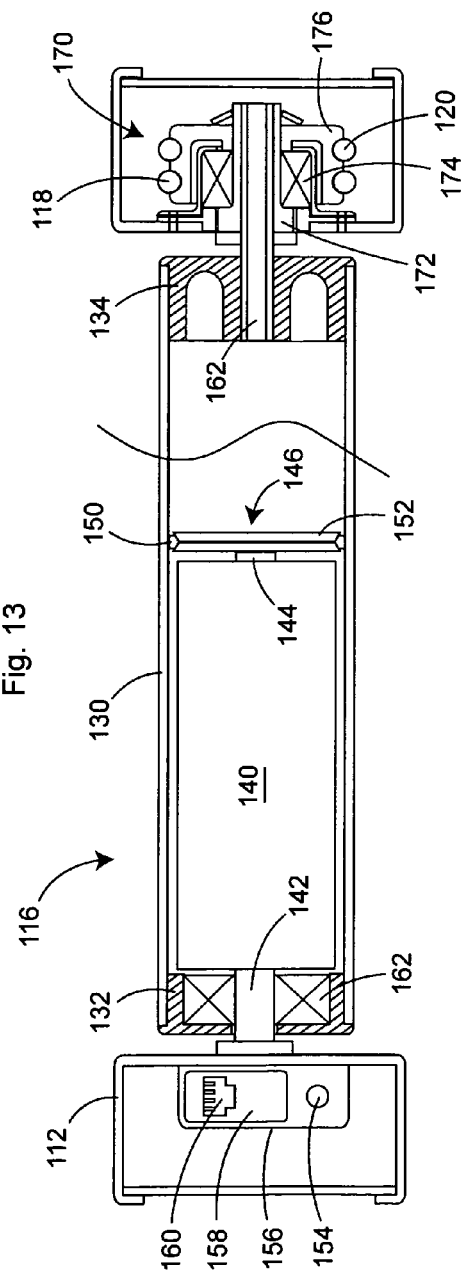

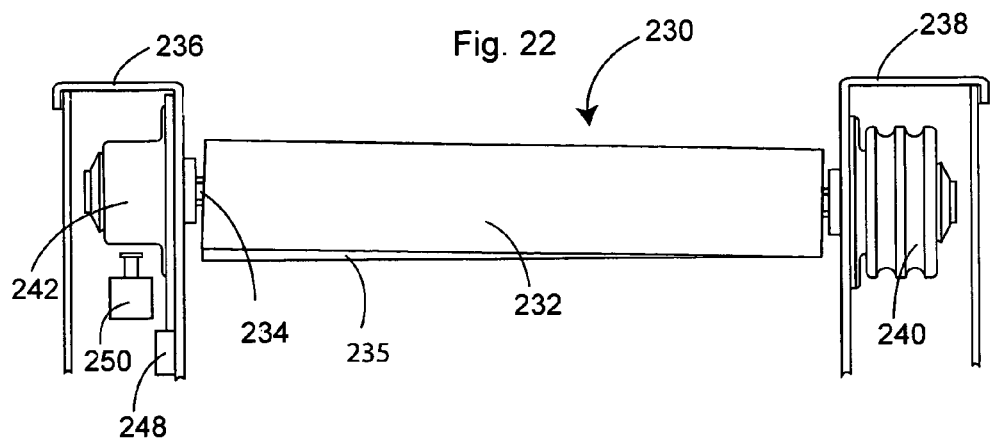
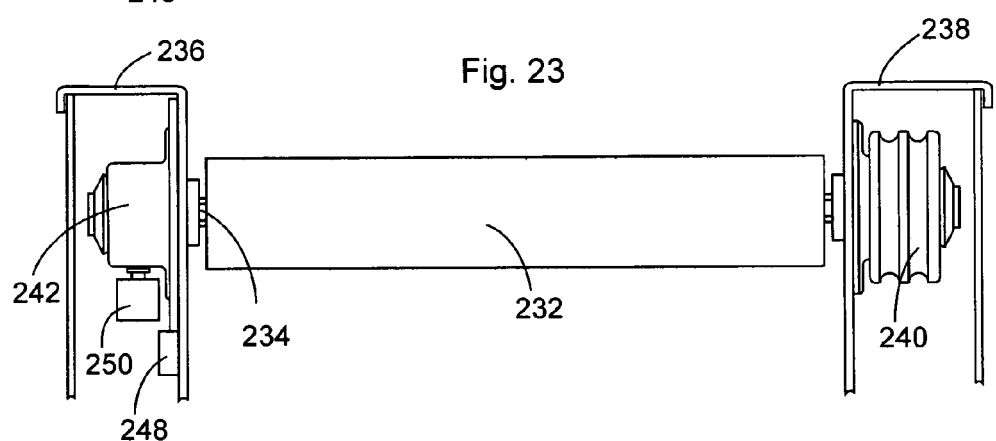
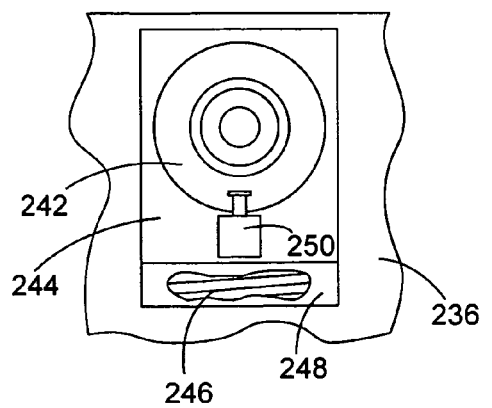
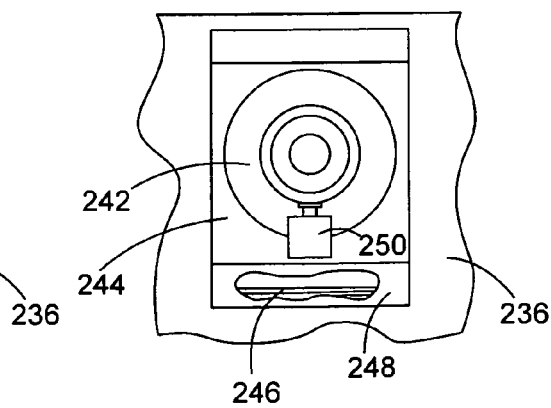

ROLLER CONVEYOR, DRIVE SYSTEM AND DETECTOR SYSTEM

This application claims the benefit of the filing dates of Provisional Application Ser. No. 61/284,255, filed Dec. 16, 2009; Provisional Application Ser. No. 61/337,683, filed Feb. 11, 2010; and Provisional Application Ser. No. 61/338,731, filed Feb. 23, 2010, all of the Provisional Applications being incorporated herein by reference in their entireties.

BACKGROUND OF THE INVENTION (1) Field of the Invention

The present invention relates generally to roller conveyors, and in particular to roller conveyors having a drive system isolated from the rollers, and to a system for detecting the presence and position of objects being conveyed on a roller conveyor and generating a signal in response to the detection of an object.

(2) Description of the Prior Art

Roller conveyors used to convey articles along a given pathway are generally comprised of a plurality of spaced, parallel rollers positioned along and transverse to the pathway. A frame having parallel roller support sections supports the rollers. Each roller has a shaft that is supported at its opposed ends by the frame support sections. The portion of each shaft between the support sections includes a roller body that is used to support the article being conveyed. The roller body may be affixed to the shaft or freely rotatable thereon. The roller body may be continuous along the axis of the roller, or discontinuous, i.e., formed of a plurality of roller body segments or wheels.

A conveyor roller may be a driven roller, i.e., the roller is rotated by a connected drive means, or an idler roller, i.e., the roller is rotated only by the movement of the article across the roller surface. Generally, a plurality of driven rollers are rotated by a single drive means comprised of a rotational power source connected to the plurality of driven rollers either directly or indirectly, by drive connectors, such as belts or chains extending around pulleys or sprockets on the roller shafts. As used herein the term "drive means" is understood to include the power source and the drive connectors.

In many roller conveyor designs, the drive connectors are attached to the rollers within the area where articles are conveyed, e.g., by extending belts around grooves in the roller surfaces. As a result, the articles being conveyed are subject to contamination from the belts that can carry debris into the conveyor pathway. In addition, attachment of belts in this manner makes it difficult to replace or repair the rollers, belts and the drive means to which the belts are attached.

Roller conveyors normally include detectors to detect the presence and position of objects being conveyed on the conveyor. Upon detecting an object, the detector provides input to a counting device or to activate or deactivate power in specific conveyor zone, allowing for pressure-free accumulation of conveyed objects.

Prior art detectors include mechanical contact switches, and non-contact photo-optic or proximity sensors. Both types of prior art detectors have their disadvantages. Mechanical detectors are generally installed between rollers and require spacing of the rollers, impeding smooth flow. Mechanical detectors are also subject to damage by conveyed goods. Photo-optic devices require continual power and need to be wired. Their light sources can also be fooled by ambient light, and are subject to malfunction by dirt and dust. Photo-optic devices are also expensive.

Therefore, there is a continuing need for an improved roller conveyor apparatus having a drive means that is isolated from the rollers and which can be easily attached and replaced. There is also a need for a roller conveyor having an inexpensive detector that will reliably detect the presence of objects on the conveyor and create a signal to another component of the conveyor.

SUMMARY OF THE INVENTION

Generally, the roller conveyor of the present invention is comprised of a conveyor frame, a plurality of parallel driven rollers supported by the frame, and a drive means operably attached to an end of each shaft.

The conveyor frame includes a pair of spaced, parallel side rails each having a vertical wall with an inner face, an outer face, and spaced shaft-receiving openings mirroring the opening in the other side rail. The side rails may also be configured to further isolate the drive means from the rollers, e.g., with an upper wall extending outwardly from the upper edge of the vertical wall.

Each drive roller is comprised of a shaft that extends through corresponding openings in the side walls. The shaft may be a continuous shaft extending from through the roller, or a discontinuous shaft comprised of a pair of stub shafts, each stub shaft extending from a roller end. As used herein, the term "shaft" is intended to encompass both continuous and discontinuous shafts. Different roller bodies, as later described, can be fitted around the shafts.

One shaft end extends through a drive cartridge attached to the outer face of one side rail vertical wall and the other shaft end extends through an idler cartridge attached to the outer face of the other side rail vertical wall. The drive cartridge and idler cartridge may be of different configurations. For convenience in construction and maintenance, however, the drive and idler cartridges may include some components in common.

If using the same components, each cartridge may include a shield having an inner shoulder with an outer diameter corresponding to the inner diameter of the wall opening. The shield can include an inner shoulder to be inserted into the opening during assembly. The inner shoulder facilitates alignment of the shield. The shield also includes a flange with bolt openings.

The cartridge also includes housing with a continuous side wall, an outer end wall with a shaft receiving opening and a housing flange with bolt holes corresponding to the shield flange extending outwardly from the inner edge of the side wall.

A donut-shaped bearing is positioned inside the housing side wall between the shield and the housing end wall. The opening of the bearing is sized to receive the shaft.

The shaft, which may include bushings at each end, extends through the wall openings to receive the cartridges. A shield is placed around the shaft end and slid forward until the shield shoulder is fitted into the wall opening.

The bearing is then fitted over the shaft end and slid into contact with the shield, which may also include an outer shoulder for contact with the bearing. The bearing may also rest against the shaft bushing, which is sized to fit within the shield inner shoulder.

The housing is then inserted onto the end of the shaft and around the bearing. The bolt holes of the housing are aligned with the bolt holes of the shield and both are bolted or riveted on the wall which has corresponding bolt holes.

In addition to the above components, the drive cartridge also includes a pulley affixed to the end of the shaft. The shaft pulley includes a continuous, cylindrical side wall and an outer, annular end wall. The side wall has an inner face spaced from the housing side wall and an outer face configured to receive continuous drive belts. The end wall center opening is sized to receive the shaft. The end wall may also include a cylindrical shoulder extending inwardly along the shaft through the housing end wall opening to abut the outer side of the bearing.

The shaft pulley may be affixed, e.g., keyed, to the shaft so that rotation of the pulley rotates the shaft. Alternatively, the pulley may be held onto the shaft with a slidable connector such as a disc spring between the shaft and the pulley, so that the pulley may rotate relative to the shaft if, for example, the shaft is prevented from rotation due to blockage. A clutch mechanism or other type of slip mechanism may be used instead of a spring.

A drive means is also provided to rotate the drive rollers. In one embodiment, the drive means includes an electric motor with a motor pulley attached to the motor drive shaft. Different drive means configurations may be used. For example, the drive means may be comprised of an electric motor having a drive shaft similar to a roller shaft. The motor can be attached to the frame at a level beneath the rollers. In a preferred embodiment, the motor is housed inside a crosstie, i.e., a frame structural member extending between the vertical walls of the side rails. A drive cartridge having the same configuration as the previously described drive cartridge can be attached to the end of the motor shaft.

At least one continuous belt is fitted around the motor pulley and shaft pulley, whereby rotation of the motor shaft rotates the shaft pulley. The motor pulley and shaft pulley may be of the same or different diameters. Preferably, the motor is used to rotate two shaft pulleys by fitting a first belt around the motor pulley and the pulley of a cartridge on a first shaft, and a second belt around the pulley of a cartridge on a second roller. Rotation of the motor shaft then rotates the two roller shafts.

Each shaft cartridge may also be connected to another shaft cartridge by another belt, i.e., a first shaft pulley connected by a belt to the motor pulley can also be joined by a second belt to the shaft pulley of a second roller. Rotation of the motor shaft then rotates the first shaft and indirectly the second shaft.

By combining these arrangements, a single motor drive can be used to drive four or more roller shafts. That is, a motor pulley can be attached by belts to the pulleys of two shafts, which are in turn attached to pulleys of other shafts via additional belts. Rotation of the motor drive shaft will then rotate four roller shafts. It will be apparent to one skilled in the art after reading this description that even more rollers can be rotated by the single drive means by joining the rollers in series to other rollers.

Alternatively, the drive means can be comprised of a motorized drive roller of the type described, for example, in U.S. Pat. No. 5,088,596, issued Feb. 18, 1992 to Charles Agnoff, the present inventor. Generally, a motorized roller is comprised of a roller tube with a motor mounted inside the tube. The tube is rotatably mounted on shafts that are non-rotatably attached to the conveyor frame. The motor is also fixedly attached to one of the shafts. A drive member attached to the rotatable drive shaft of the motor, directly or indirectly through reducing gears, includes an elastomeric means to frictionally engage the inner wall of the roller tube. When the motor is energized, the motor shaft rotates, in turn rotating the roller tube through the drive means connection. Normally, the drive means will include a slip clutch or other mechanism allowing the drive means to rotate relative to the roller tube if a predetermined torque is exceeded.

In the present invention, a motorized roller is mounted parallel to the other rollers on the roller conveyor with one end of the roller tube being fixedly attached to a shaft stub that is fixedly attached to a pulley as described above. The motorized roller pulley is, in turn, connected via belting or other means to similar pulleys on the other rollers. When the motorized roller is energized, rotation of the roller tube causes a corresponding rotation of the pulley, thereby rotating the connected rollers. The motorized roller has several advantages over the drive means described previously, being more compact and less prone to collection of debris.

As noted earlier, roller bodies of different configurations can be carried on the roller shafts. The roller bodies may have different diameters, with rollers of one diameter being readily replaced by rollers of a different, smaller or larger, diameter. The roller body may be comprised of a plurality of spaced short rollers, or wheels, instead of a continuous roller of the same diameter along its length. The roller body may also be comprised of multiple sections with one section, e.g., the center section of three sections being driven and the other sections being freely rotatable. In yet another embodiment, the roller body, or sections of the roller body, can be conical, having a greater diameter at their outer edge than at the inner edge, e.g., for use in maintaining articles on the conveyor.

The invention also relates to a roller conveyor comprised of a plurality of spaced, parallel rollers positioned along and transverse to the conveyor pathway, one of the rollers being a detector roller that is downwardly deflectable by an object conveyed on the conveyor, and a switch whose state is changed by contact with a part of the detector roller.

More specifically, the upper surfaces of the conveyor rollers, except for the detector roller, have upper surfaces aligned along a common plane. The detector roller, which may be a drive roller or an idler roller, has at least one end that is mounted for vertical movement and spring-biased so that a part of the roller projects above the common plane of the other rollers by a small amount, e.g., about $5/16$ inch. The detector roller is mounted so that there is no break or space in the overall drive system. If the detector roller is a driven roller, it is driven in the same manner as adjacent rollers.

When a conveyed object passes over the raised detector roller, the detector roller deflects downward to the level of adjacent rollers, changing the state of a switch, e.g., a microswitch or reed switch, which can be positioned outside the conveyor pathway so as not to disrupt flow. The switch is in circuit with another component of the conveyor system, e.g., a conveyor drive motor, a control device, and/or a counter, to activate or deactivate the other component. For example, when the switch state is changed, the motor circuit can be opened, stopping the motor, and thereby stopping the conveyor.

BRIEF DESCRIPTION OF THE DRAWINGS

FIG. 5 is a sectional side view of a drive cartridge for use with a belt having a multi-ribbed cross-section.

FIGS. 6-11 are sectional end views of representative crosstie cross-sections for use in mounting the drive motor.

FIG. 12 is a side view of the roller conveyor of the second embodiment.

FIG. 13 is a sectional end view of the motorized drive roller of the second embodiment.

FIG. 22 is an end view of a driven roller with the non-powered end in the raised position.

FIG. 23 is an end view of a driven roller with the non-powered end in the lowered position.

FIG. 24 is a sectional side view of the non-powered end of the roller of FIG. 22 in the raised position showing the microswitch in the non-compressed state.

FIG. 25 is a sectional side view of the non-powered end of the roller of FIG. 23 in the lowered position showing the microswitch in the compressed state.

DETAILED DESCRIPTION OF THE INVENTION

Figure 2:
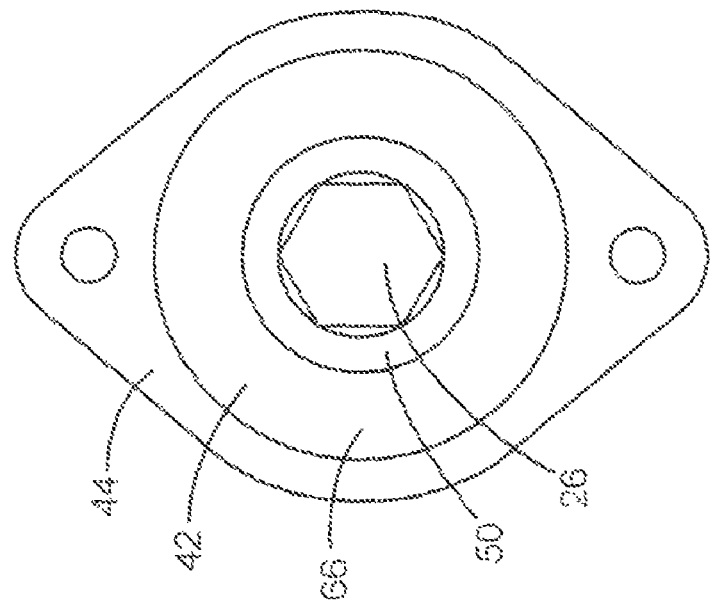
FIG. 2 is a front view of the cartridge housing.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

With reference to FIGS. 1-9 illustrating the first embodiment of the invention, roller conveyor, generally 10, is comprised of a frame 12, and a plurality of parallel driven rollers 84, 90, 94, and 98 supported by frame 12 and rotated by drive means 16. Frame 12 includes a pair of spaced, parallel side rails 20 each having a vertical wall with an inner face, an outer face, and spaced shaft-receiving openings 22 mirroring the opening in the other side rail. Side rails 20 may also include an upper wall extending outwardly from the upper edge of the vertical wall and a vertical outer wall 24 to isolate the drive means from the rollers and to form a protective covering.

Each drive roller is comprised of a shaft 26 that extends through corresponding openings in the side walls. While a continuous shaft is illustrated, it will be understood that a discontinuous shaft with separate ends may be used. Different roller bodies, as later described, can be fitted around the shafts. One end of each shaft 26 extends through a drive cartridge, generally 30, attached to the outer face of a vertical wall of a side rail 20 and the other end of the shaft extends through an idler cartridge 32 attached to the outer face of the vertical wall of the other side rail 20.

Each drive cartridge 30 and idler cartridge 32 includes a shield 34 having an inner shoulder 36 with an outer diameter corresponding to the inner diameter of wall opening 22 to facilitate alignment of shield 34. Shield 34 also includes flange 38 with bolt openings 40. Each cartridge also includes a housing 42 with a continuous side wall, an outer end wall with a shaft receiving opening and a housing flange 44 with bolt holes corresponding to shield flange 38. Bearing 46 is positioned inside the housing side wall between shield 34 and the housing end wall. The opening of bearing 46 is sized to receive shaft 26.

When assembling a cartridge, whether drive cartridge 30 or idler cartridge 32, shaft 26, which may include bushings 50, is first inserted through the wall openings 22 to receive cartridges 30 and 32. Shield 34 is then placed around the shaft end and slid forward until the shield shoulder 36 fits into the wall opening 22. Bearing 46 is then fitted over each shaft end and slid into contact with shield 34, which may also include outer shoulder 52 for contact with bearing 46, which rests against shaft bushing 50. Housing 42 is then inserted onto each end of shaft 25 and over bearing 46. The bolt holes of housing 42 are aligned with the bolt holes of shield 34 and both are bolted onto rail 20, which has corresponding bolt holes.

Drive cartridge 30 also includes pulley 54 affixed to one end of shaft. Pulley 54 includes a continuous, cylindrical side wall 56 and an outer, annular end wall 60. Side wall 56 has an inner face spaced from the side wall of housing 42 and an outer face configured to receive a continuous drive belt 86. The center opening of end wall 60 is sized to receive shaft 26. End wall 60 may also include a cylindrical shoulder 64 extending inwardly along shaft 26 to abut the outer side of bearing 46.

Pulley 54 may be affixed, e.g., screwed, to shaft 26 so that pulley 54 and shaft 26 must rotate together. Preferably, however, pulley 54 is attached to shaft 26 with a slip connector such as disc spring 66, so that pulley 54 can rotate relative to shaft 26 if shaft 26 is prevented from rotation, e.g., due to blockage. A slip clutch or other type of slip mechanism may be used instead of spring 66.

The drive means of the first embodiment further includes electric motor 70 with a pulley attached to the motor drive shaft. Motor 70 is housed inside crosstie 72 extending between side rails 20 and forming a structural member of frame 10. Crossties of various cross-sectional configurations can be used to enclose motor 70. Representative crosstie cross-sections are shown in FIGS. 5-9. A drive cartridge having the same configuration as previously described drive cartridge 30 is attached to the end of the motor shaft. An electrical cable 74 extends from the opposite end of crosstie 72 to provide power to motor 70.

Each motor 70 may also be controlled via a controller 76 connected via connector 78 to like motors to operate the motors and rollers controlled thereby in sequence, e.g., in accumulating conveyor systems comprised of a plurality of segments each formed of a motor and a plurality, e.g., four, rollers. In operation, each segment is activated only when an article to be conveyed is present, with the next segment detecting when an article is approaching.

Figure 3:
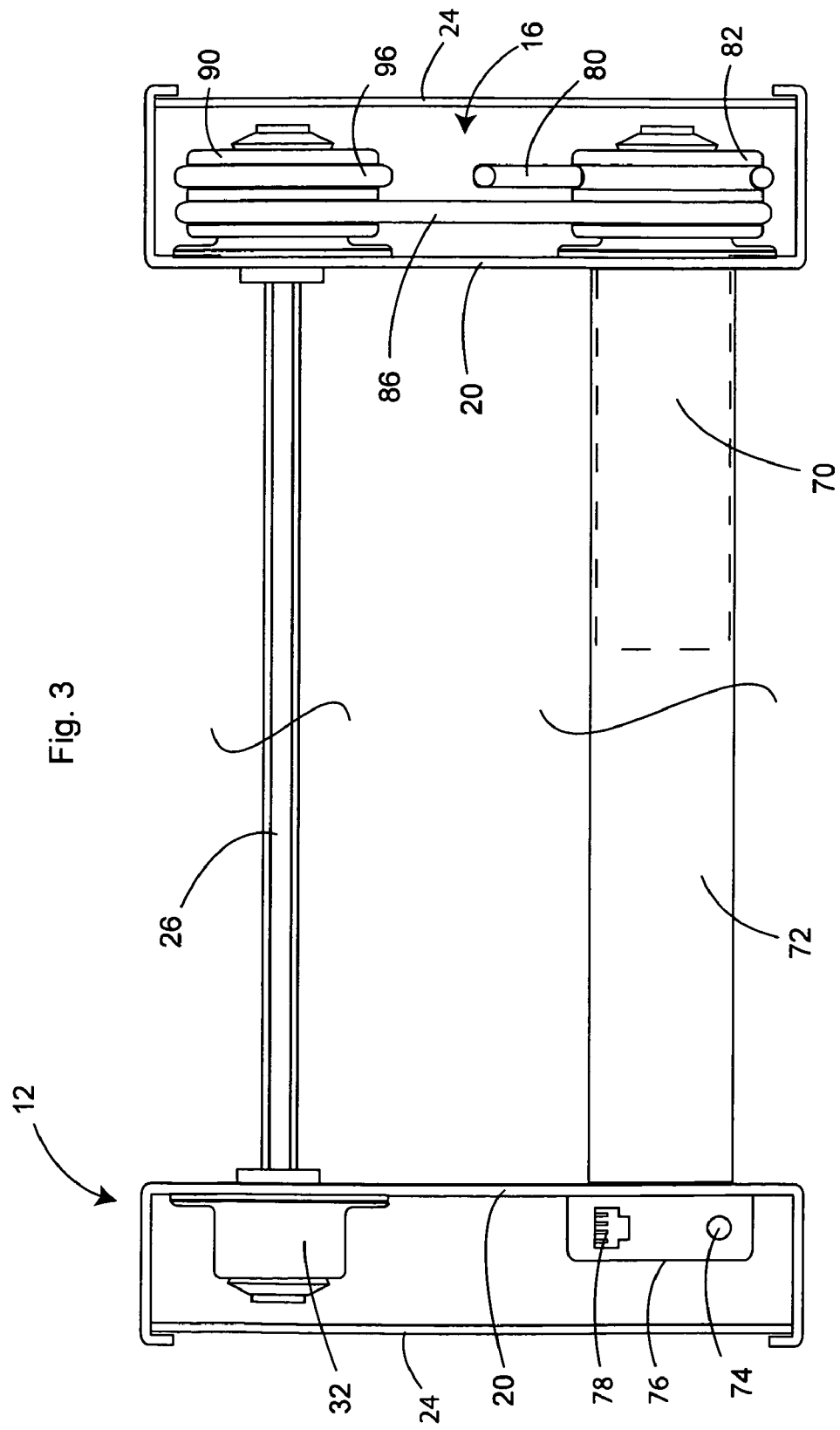
FIG. 3 is an end view of the roller conveyor of a first embodiment.
Figure 4:
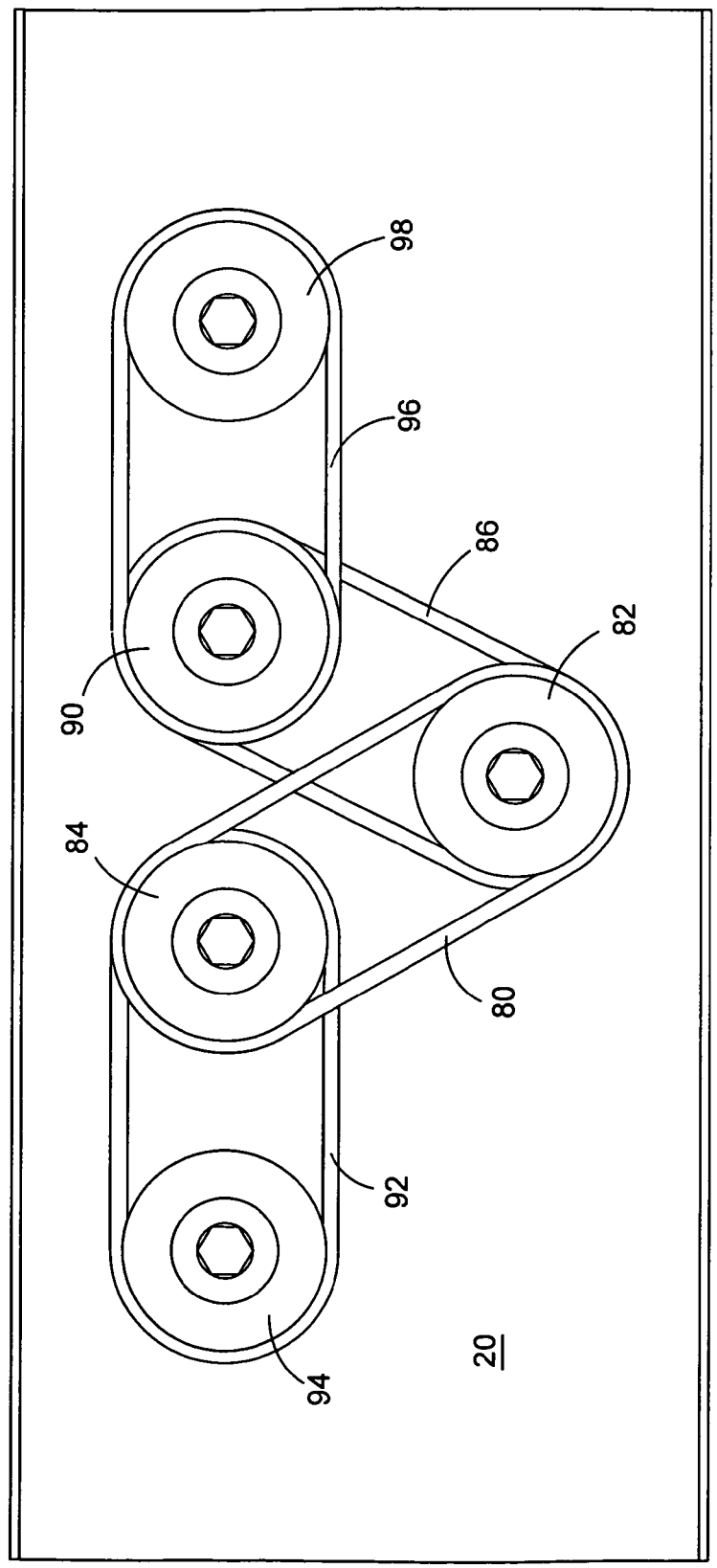
FIG. 4 is a side view of the roller conveyor of a first embodiment.

As illustrated in FIGS. 3 and 4, a first drive belt 80 is positioned around motor pulley 82 and shaft drive pulley 84. Second belt 86 extends around motor pulley 82 and second shaft pulley 90. A third belt 92 extends around shaft pulley 84 and an adjacent shaft pulley 94. A fourth belt 96 extends around pulley 90 and a fourth shaft pulley 98. With this configuration, a single motor is used to rotate four shafts. It will be apparent that additional pulleys can be attached by additional belts to shaft pulleys 94 and 98, and in turn, connected to other pulleys, thereby enabling rotation of even more shafts by a single motor.

Figure 1:
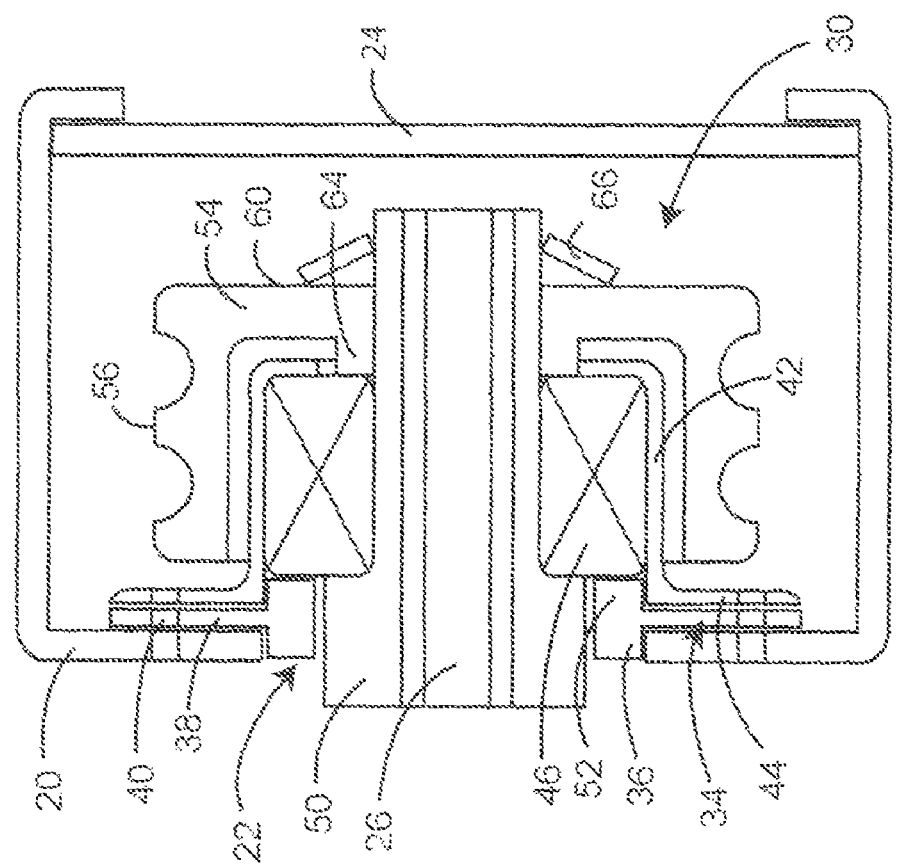
FIG. 1 is a sectional side view of the drive cartridge attached to a frame and mounted on the end of a shaft.

Other types of belts may be used instead of belts having a circular cross-section as illustrated in FIGS. 1 and 3. For example, the belt may be a multi-ribbed belt 100 such as illustrated in FIG. 10. Illustrated belt 100 is comprised of a plurality of ribs having lower ends tapered inwardly at about 40° to fit within corresponding grooves in pulley 102.

Referring to the second embodiment of the invention specifically illustrated in FIGS. 12 and 13, conveyor, generally 110, is comprised of a frame 112, similar in construction to frame 12 shown above, and a plurality of parallel driven rollers 114 supported by frame 112 and rotated by motorized roller 116 via belts 118, 120 and 122.

Roller 116, shown in detail in FIG. 13, is comprised of a roller tube 130 mounted on end caps 132 and 134. DC motor 140 is mounted inside tube 130 with the diameter of the inner continuous wall of tube 130 being slightly greater than the outer diameter of motor 140. Motor 140 is fixedly attached to one end of mounting shaft 142, with the other end of shaft 142 being fixedly attached to frame 112.

Motor 140 includes rotatable drive shaft 144 extending from motor 140 opposite from mounting shaft 142. Drive member 146 is mounted on the end of drive shaft 144 to transfer rotational force to the inner wall of tube 130. Drive member 146 is comprised of a cylindrical elastomeric member 150 sized to frictionally engage the inner wall of tube 110. Elastomeric member 150 is held by slip clutch 152.

Current is supplied to motor 140 via electrical cable 154 extending from controller housing 156 through mounting shaft 142. Housing 156 also includes controller 158 connected via connector 160 to like motorized rollers to energize the motorized rollers and rollers controlled thereby in sequence as described with reference to the first embodiment.

Bearings 162 are mounted between end cap 132 mounting shaft 142, allowing for free rotation of tube 130. End cap 134 is fixedly attached to the proximal end of hexagonal cartridge shaft 162. The distal end of cartridge shaft 162 extends into cartridge, generally 170, having the configuration illustrated in detail in FIG. 1 and described above with reference thereto. Generally, shaft 162, surrounded by bushing 172, extends through bearing 174 and is attached to pulley 176. Belts 118 and 120 extend around pulley 176.

In operation of the second embodiment, energizing of motor 140 causes rotation of tube 130 via rotation of drive shaft 144 and drive member 146. Rotation of tube 130 rotates shaft 162, which rotates pulley 176. Rotation of pulley 176 rotates the corresponding pulleys 178 of rollers 114.

While motorized roller 116 is shown as the end roller in conveyor 110, it will be understood that roller 116 can also be mounted between driven rollers. The conveyor may include more than four rollers, and more than one roller can be a motorized roller. Also, pulleys and belt configurations, such as the multi-ribbed belts 100 illustrated in FIG. 5, may be used instead of pulley 176 and belts 118 and 120.

Figure 14:
FIG. 14 is an illustration of one type of roller body.
Figure 15:
FIG. 15 is an illustration of another type of roller body.
Figure 16:
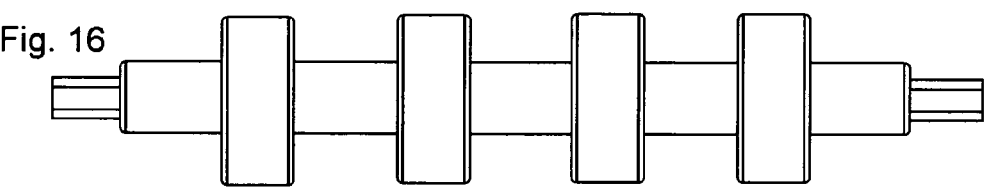
FIG. 16 is an illustration of another type of roller body.

FIGS. 14-18 illustrate examples of roller bodies. FIG. 14 illustrates a cylindrical roller body of a given diameter. FIG. 15 illustrates a roller body of a smaller diameter. FIG. 16 illustrates a roller body comprised of a plurality of spaced wheels.

Figure 17:
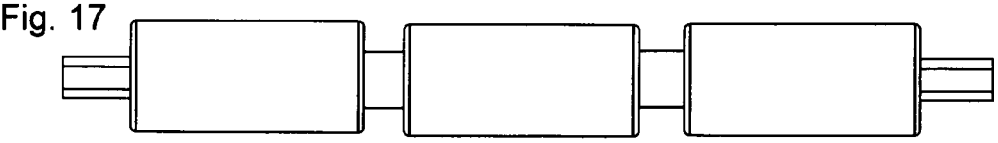
FIG. 17 is an illustration of another type of roller body.
Figure 18:
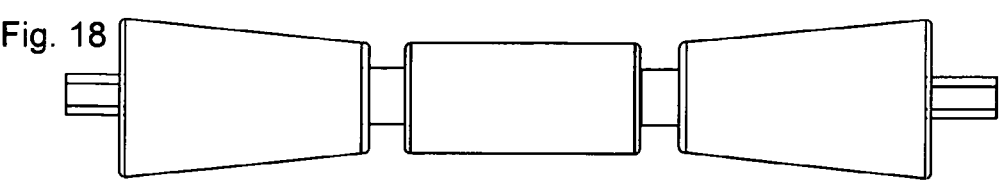
FIG. 18 is an illustration of another type of roller body.

FIG. 17 illustrates a roller body comprised of a plurality of spaced short cylinders. FIG. 18 illustrates a roller body comprised of a plurality of roller body segments in which the outer segments are of a truncated conical shape with the outer ends being of a greater diameter than the inner ends to aid in holding articles on the conveyor. In the bodies shown in FIGS. 17 and 18, one or more of the segments may be freely rotatable with one or more of the segments being driven. For example, the center segment may be driven while the outer segments are freely rotatable.

Figure 19:
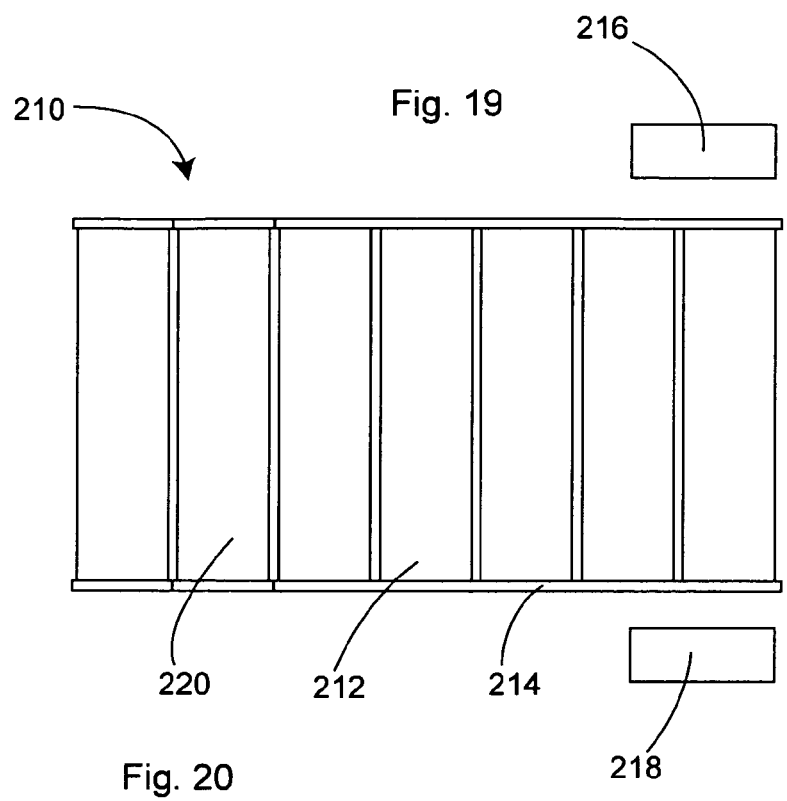
FIG. 19 is a top view of a roller conveyor including a vertically adjustable roller.
Figure 20:
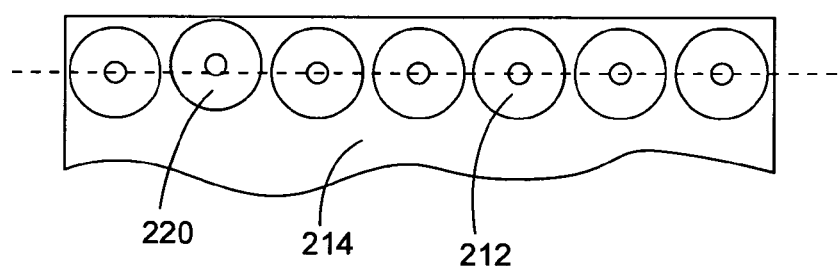
FIG. 20 is a sectional side view of a roller conveyor with the vertically adjustable roller in the raised position.
Figure 21:
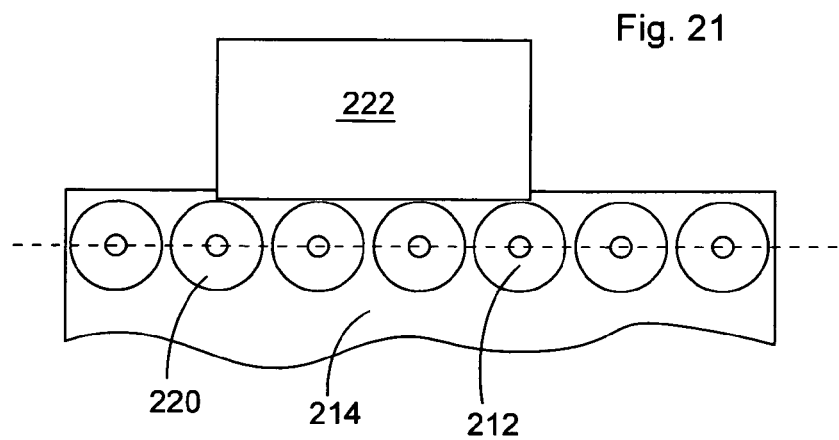
FIG. 21 is a sectional side view of a roller conveyor with the vertically adjustable roller deflected downwardly to the level of the other rollers by a conveyed object.

Turning to the detector system, as best shown in FIGS. 19-21, roller conveyor, generally 210, is comprised of a plurality of parallel rollers 212 mounted between frame members 214. Conveyor 210 also includes a power circuit 216 with one or more motors, providing rotating rollers 212, and a counter circuit 218. Detector roller 220 is parallel to rollers 212 and may or may not be powered depending on the design of the system.

When no downward force is applied, roller 220 is in the raised position shown in FIG. 20, with the upper surface of at least one end of roller 220 being above the plane of rollers 212. When an object 222 conveyed along conveyor 212 engages roller 220, however, a downward force is exerted on roller 220, deflecting roller 220 downward to the lowered position shown in FIG. 21, in which the upper surface of roller 220 is in a common plane with the upper surfaces of rollers 212.

FIGS. 22-25 illustrate a drive roller, generally 230, comprised of a roller 232 mounted on shaft 234 extending between opposed frame members 236 and 238. A non-detector roller 235 is partially hidden behind roller 232 in FIG. 22. Shaft 234 is rotated by a motor, not shown, connected via belts to pulley 240 mounted outside frame member 238 to the powered end of roller 232. The non-powered end of roller 232 extends into housing 242, which has a raised position as shown in FIGS. 22 and 24, and a lowered position as shown in FIGS. 23 and 25.

Housing 242 is mounted on moveable plate 244, which is urged upwardly to the raised position by spring 246 in housing 248. Spring 246 may be a leaf spring, a coil spring, or other spring designs known to one skilled in the art, the only requirement being that the spring has an uncompressed state and a compressed state, with plate 244 being urged upwardly when spring 246 is in the uncompressed state.

Switch 250, mounted beneath housing 242, has a non-compressed state and a compressed state. When housing 242 is moved from the raised position shown in FIGS. 22 and 24 to the lowered position shown in FIGS. 23 and 25 as a result of downward pressure being exerted on roller 232 by an object 220 on conveyor 210, housing 242 engages and compresses switch 250, changing the state of switch 250. Switch 250 may be in a circuit with power circuit 214 or counter circuit 216. Depending on the circuit configuration, change of the state of switch 250 may interrupt power to the motor driving rollers 212 and 218, thereby stopping conveyor 210, or count the object 220 as it is conveyed along conveyor 210.

Figure 26:
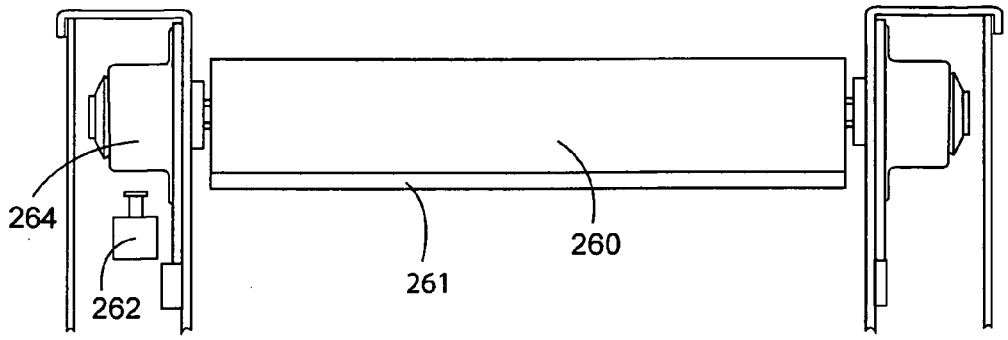
FIG. 26 is an end view of an idler roller with both ends in the raised position with the microswitch in the non-compressed state.
Figure 27:
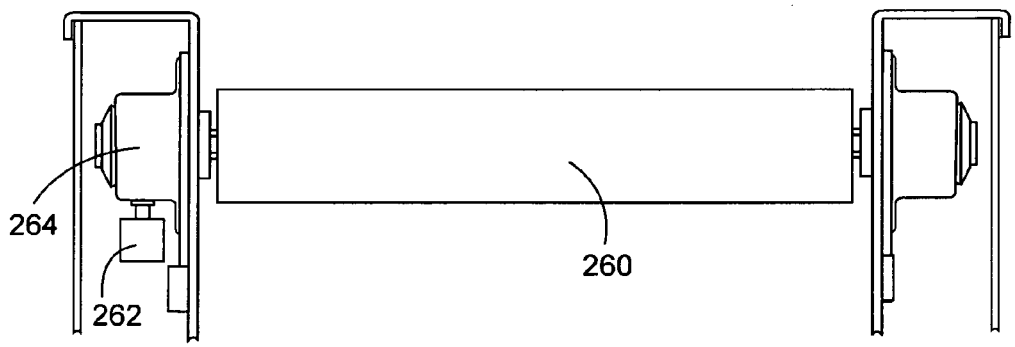
FIG. 27 is an end view of an idler roller with both ends in the lowered position with the microswitch in the compressed state.

FIGS. 26 and 27 illustrate an alternative embodiment in which both ends of roller 260 are in a raised position when no downward pressure is applied to roller 260, illustrated in FIG. 26, and a lowered position when downward pressure is applied to roller 260, as illustrated in FIG. 27. A non-detector roller 261 is partially hidden behind roller 232 in FIG. 26. As shown, roller 260 is an idler roller. However, it will be understood that the present invention contemplates a drive roller in which both ends are raised when no downward force is applied and lowered when a downward force is applied.

As with the configuration shown in FIGS. 22-25, a switch 262 is compressed by housing 264 at one end of roller 260 when roller 260 is deflected downward by a weight on the upper surface of roller 260. While the specific embodiments show compression of switch 250 or 262 by the housing at the end of the roller, it will be understood that the switch can also be positioned to be compressed by another element that moves downward when a downward force, e.g., an object moving along the conveyor, forces one or both ends of the roller downward.

The change in the positions of the rollers in the embodiments between their raised positions and their lowered positions is exaggerated for purposes of illustrating the invention. Only a small movement of the detector roller is in fact required to change the state of the switch. For example, with an average conveyor width of 18 inches, the vertical difference of only about 5/16 inch is sufficient to compress a switch. Thus, the axis of the detector roller in the uncompressed state is only one degree from the axis of the compressed roller.

Figure 28:
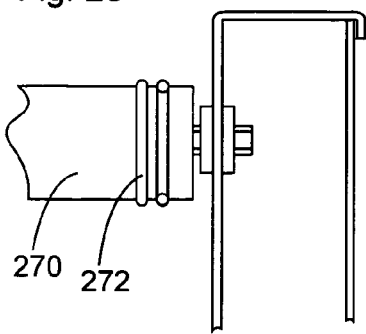
FIG. 28 is a partial end view of a drive roller power by way of belts around the roller.
Figure 29:
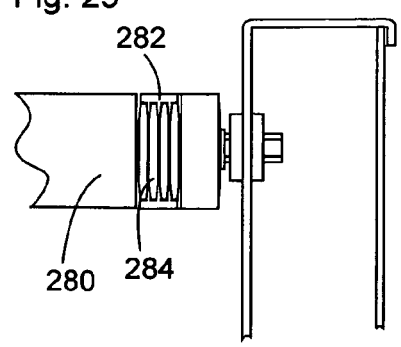
FIG. 29 is a partial end view of a drive roller powered by way of a ribbed belt around a grooved pulley at an end of the roller.

It will be understood that the detector system of the present invention is not dependent on the manner in which the drive roller is rotated. FIGS. 28 and 29 illustrate alternative known means of rotating a roller conveyor drive or driven roller. In FIG. 28, roller 270 is rotated by belts 272 extending around the body of roller 270. In FIG. 29, roller 280 is rotated by grooved belts 282 around ribbed pulley 284 at the end of roller 280.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A roller conveyor comprised of:
    a) a frame including first and second spaced, parallel side rails, each rail having a vertical wall with inner and outer faces, and shaft-receiving opening mirroring shaft-receiving openings in the other side rail;
    b) a plurality of parallel driven rollers, each roller having a first shaft end extending through a shaft-receiving opening in the first wall and a second shaft end extending through a shaft-receiving opening in the second side wall;
    c) a shaft pulley affixed to the first shaft end outside of said first wall;
    d) a rotary drive means including a motorized roller mounted parallel to said driven rollers and a rotatable drive pulley mounted outside said first wall, said motorized roller including a roller tube fixedly mounted on a first roller tube shaft extending through said first rail and a second roller tube shaft extending through said second rail, a drive motor within said roller tube adapted to rotate said roller tube, said drive pulley being affixed to said first roller tube shaft outside said first rail; and
    e) connector means operably connecting said drive pulley to said shaft pulleys, whereby rotation of said drive means rotates said driven rollers.

2. The roller conveyor of claim 1, wherein said drive means is an electric motor having a shaft operably connected to said drive pulley.

3. The roller conveyor of claim 2, wherein said electric motor is mounted within a housing extending between said rails.

4. The roller conveyor of claim 1, wherein said frame includes upper horizontal walls extending outwardly from said side rails above said pulleys.

5. The roller conveyor of claim 1, wherein at least one of said rollers is downwardly deflectable, said roller conveyor further including a switch that changes state when said roller is deflected.

6. The roller conveyor of claim 1, wherein said connector means are continuous belts extending around said drive pulley and at least one shaft pulley.

7. The roller conveyor of claim 6, wherein a first belt extends around said drive pulley and a first shaft pulley, and a second belt extends around said drive pulley and a second shaft pulley.

8. The roller conveyor of claim 7, further including a third belt extending around said first shaft pulley and a third shaft pulley.

9. The roller conveyor of claim 1, further including drive cartridges attachable to the outside of said first rail and idler cartridges attachable to the outside wall of said second rail, a first shaft end extending outwardly though each of said drive cartridges and a second shaft end extending outwardly through each of said idler cartridges.

10. A roller conveyor comprised of:
    a) a frame including first and second spaced, parallel side rails, each rail having a vertical wall with inner and outer faces, and shaft-receiving opening mirroring shaft-receiving openings in the other side rail;
    b) a plurality of parallel driven rollers, each roller having a first shaft end extending through a shaft-receiving opening in the first wall and a second shaft end extending through a shaft-receiving opening in the second side wall;
    c) drive cartridges attachable to the outside of said first rail and idler cartridges attachable to the outside wall of said second rail, the first shaft end extending outwardly though each of said drive cartridges and the second shaft end extending outwardly through each of said idler cartridges;
    d) a shaft pulley affixed to the first end of each shaft outside of said first wall;
    e) an electric motor operably associated with a rotatable drive pulley mounted outside said first wall; and
    f) a plurality of continuous belts extending around said pulleys to operably connect said drive pulley to said shaft pulleys, whereby rotation of said drive pulley by said electric motor rotates said drive rollers.

11. The roller conveyor of claim 10, wherein said electric motor is mounted within a crosstie extending between said rails.

12. The roller conveyor of claim 10, further including a roller tube mounted parallel to said driven rollers, said electric motor being mounted within said roller tube to rotate said tube and said drive pulley.

13. The roller conveyor of claim 10, wherein at least one of said rollers is downwardly deflectable, said roller conveyor further including a switch that changes state when said roller is deflected.

14. A roller conveyor comprised of:
    a) a frame including first and second spaced, parallel side rails, each rail having a vertical wall with inner and outer faces, and shaft-receiving opening mirroring shaft-receiving openings in the other side rail;
    b) a plurality of parallel driven rollers, each roller having a first shaft end extending through a shaft-receiving opening in the first wall and a second shaft end extending through a shaft-receiving opening in the second side wall;
    c) a shaft pulley affixed to the first shaft end outside of first wall;
    d) a rotary drive means including a rotatable drive pulley mounted outside said first wall; and
    e) continuous belts operably connecting said drive pulley to said shaft pulleys, whereby rotation of said drive means rotates said driven rollers, said belts including a first belt extending around said drive pulley and a first shaft pulley, and a second belt extending around said drive pulley and a second shaft pulley.

15. The roller conveyor of claim 14, further including a sensing roller having a first position and second position lower than said first position, and a switch having two states, the state of said switch being changed when said sensing roller is moved from the first position to the second position.

16. The roller conveyor of claim 15, wherein said sensing roller is also a driven roller.

17. A roller conveyor comprised of:
   a) a frame including first and second spaced, parallel side rails, each rail having a vertical wall with inner and outer faces, and shaft-receiving opening mirroring shaft-receiving openings in the other side rail;
   b) a plurality of parallel driven rollers, each roller having a first shaft end extending through a shaft-receiving opening in the first wall and a second shaft end extending through a shaft-receiving opening in the second side wall;
   c) a shaft pulley affixed to the first shaft end outside of said first wall;
   d) a rotary drive means including a rotatable drive pulley mounted outside said first wall; and
   e) connector means operably connecting said drive pulley to said shaft pulleys, whereby rotation of said drive means rotates said driven rollers; and
   f) drive cartridges attachable to the outside of said first rail and idler cartridges attachable to the outside wall of said second rail, and a first shaft end extending outwardly though each of said drive cartridges.

18. The roller conveyor of claim 17, further including a sensing roller having a first position and second position lower than said first position, and a switch having two states, the state of said switch being changed when said sensing roller is moved from the first position to the second position.

19. The roller conveyor of claim 18, wherein said sensing roller is also a driven roller.

* * * * *